US006378025B1

(12) United States Patent
Getty

(10) Patent No.: US 6,378,025 B1
(45) Date of Patent: Apr. 23, 2002

(54) AUTOMATIC MULTI-MODE TERMINATION

(75) Inventor: Donald R. Getty, Huntington Beach, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/273,401

(22) Filed: Mar. 22, 1999

(51) Int. Cl.$^7$ ............................................. G06F 13/00
(52) U.S. Cl. ........................................ 710/300; 326/30
(58) Field of Search ........................... 326/30; 710/101, 710/102, 103, 300, 301, 302, 100

(56) References Cited

U.S. PATENT DOCUMENTS

| | | | | |
|---|---|---|---|---|
| 5,434,516 A | * | 7/1995 | Kosco | 326/30 |
| 5,673,480 A | * | 10/1997 | Buchheister, Jr. et al. | 29/843 |
| 5,680,555 A | * | 10/1997 | Bodo et al. | 710/101 |
| RE36,789 E | * | 7/2000 | Mandel et al. | 326/30 |
| 6,125,414 A | * | 9/2000 | Ali | 710/64 |
| 6,151,649 A | * | 11/2000 | Liong et al. | 710/126 |
| 6,173,344 B1 | * | 1/2001 | Mohammed et al. | 710/62 |
| 6,192,433 B1 | * | 2/2001 | Chan et al. | 710/101 |

FOREIGN PATENT DOCUMENTS

EP   0645716 A1  *  8/1994  ........... G06F/13/40

* cited by examiner

*Primary Examiner*—Glenn A. Auve
(74) *Attorney, Agent, or Firm*—Martine & Penilla, LLP

(57) ABSTRACT

A SCSI host bus adaptor provides automatic termination for any port thereof to which no device is attached. The host bus adaptor detects whether single ended (SE) or low voltage differential (LVD) devices are attached thereto and provides the appropriate termination therefor. The last device attached to either port of the host bus adaptor is automatically terminated via an automatic cable termination circuit disposed at the distal end of the cable. The automatic cable termination circuit senses whether single ended (SE) or low voltage differential (LVD) devices are attached to the cable and provides appropriate termination therefor.

46 Claims, 4 Drawing Sheets

FIG. 3
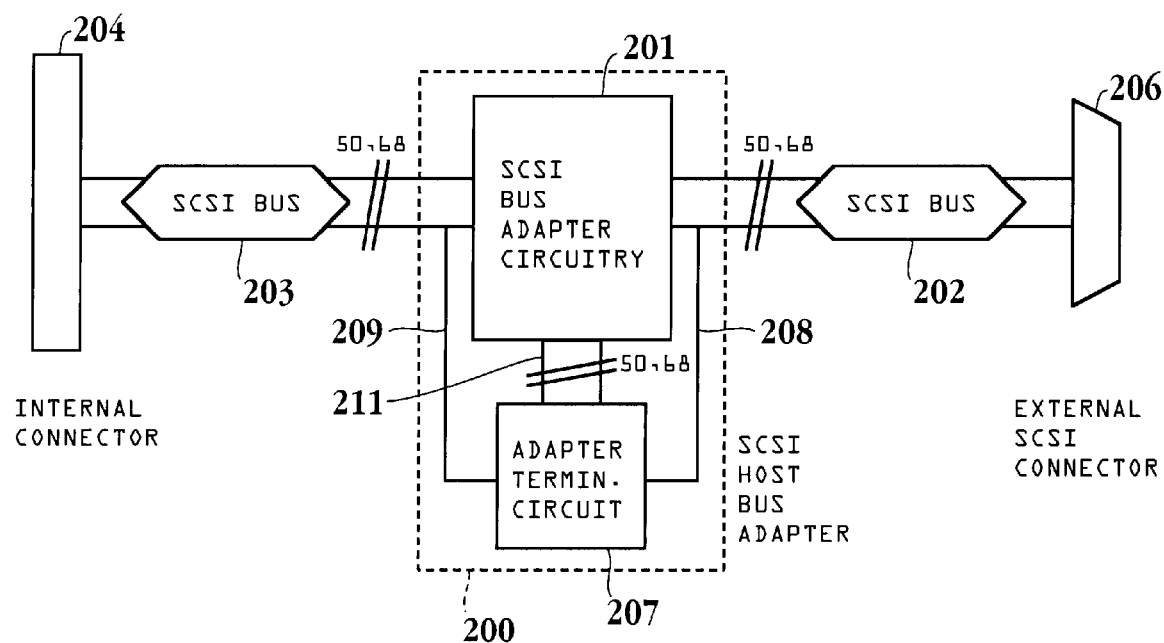
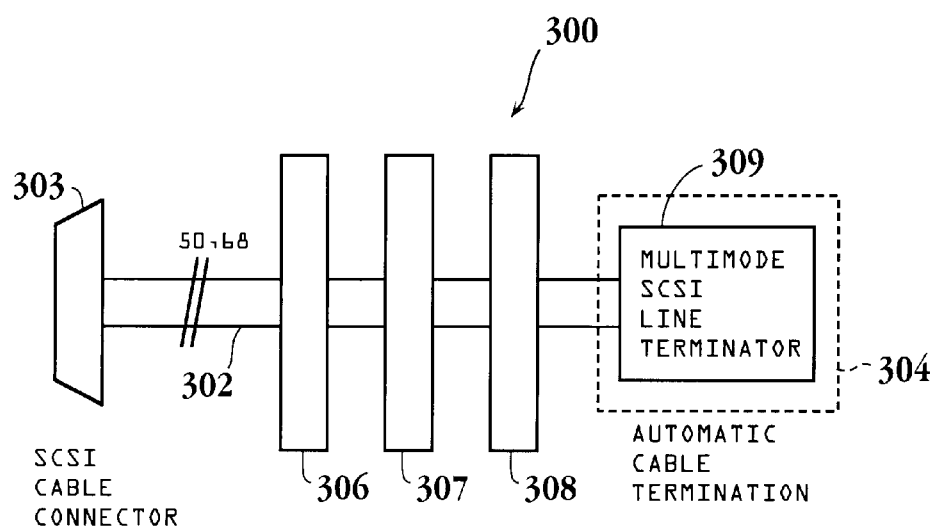
FIG. 4

AUTOMATIC MULTI-MODE TERMINATION

FIELD OF THE INVENTION

The present invention relates generally to computer bus circuitry. The present invention relates more particularly to automatic multi-mode termination for use with a Small Computer System Interface (SCSI) host bus adapter, which senses the types of devices, e.g., single ended (SE) and/or low voltage differential (LVD) and automatically provides bus termination which is appropriate for the type(s) of devices sensed, so as to eliminate the need to manually terminate either the host bus adapter or the individual devices.

BACKGROUND OF THE INVENTION

The Small Computer System Interface (SCSI) is a parallel input/output bus which may be used to connect devices such as disk drives, tape drives, CD-ROMs and other peripherals to a standard computer bus such as an Industry Standard Architecture (ISA) bus or Peripheral Component Interconnect (PCI) bus. The SCSI bus is a bi-directional multimaster bus which can accommodate peer to peer communications among multiple CPU's and multiple-peripherals. Because of its versatility and speed, the SCSI interface is becoming increasingly important in the microcomputer field.

A SCSI bus must be terminated at both ends in order to operate reliably, particularly when used at high clock rates. Such termination provides impedance matching at each end of the bus, so as to mitigate signal corruption which would otherwise occur as electronic pulses are reflected from the non-terminated ends of the bus due to impedance mismatch.

Consequently, for an SCSI host bus adapter with multiple ports, it is necessary to determine if the host bus adapter defines one end of the SCSI bus. If the SCSI host bus adapter does define one end of the SCSI bus, then the SCSI host bus adapter itself must be terminated (in addition to terminating the device at the other end of the SCSI bus). If the SCSI host bus adaptor does not constitute one end of the SCSI bus, then the last device attached to each SCSI cable (which define portions of the SCSI bus) must be terminated. In this manner, both ends of the SCSI bus are terminated, whether they are defined by the SCSI host bus adaptor or by a device.

For example, if a SCSI host bus adaptor has two ports, both of which have devices attached thereto so as to place the SCSI host bus adapter in the middle of the bus, then no termination at the SCSI host bus adapter is required. Rather, termination must be provided at the two devices on the ends of the SCSI bus. If, however, one of the two ports is vacant, then the SCSI host bus adapter, by definition, defines one end of the SCSI bus and therefore requires termination.

In response to this problem, there have been developed various methods for providing suitable termination of unoccupied SCSI host bus adaptor ports and suitable termination of the last devices on the ends of the SCSI bus.

For example, termination can be provided to the last device on either end of the SCSI bus by either attaching a terminator to the device or by enabling a built-in terminator of the device. Terminators are typically attached to such devices via the same type of SCSI connector used to attach the SCSI cable to the device. Built-in terminators are typically enabled either by installing jumpers or setting DIP switches. Unused ports of the host bus adapter can be terminated in a similar manner.

In this manner, the contemporary method for providing termination at the last SCSI device attached to the host bus adapter and/or at any unused port of the host bus adapter is accomplished manually. Thus, a person must manually attach the termination, manually install the jumpers and/or manually set the DIP switches. This process must be repeated each time a device is added to or removed from either end of the SCSI bus.

Terminating the SCSI host bus adaptor is particularly difficult, since it requires that the computer be opened so as to provide access to the SCSI host bus adaptor. Also, the SCSI host bus adapter must generally be removed from the computer to effect such termination. As those skilled in the art will appreciate, repeatedly removing and reinstalling a SCSI host bus adaptor may cause it to fail prematurely due to wear which inherently occurs to the edge connectors thereof.

In an attempt to mitigate the above mentioned difficulties associated with the manual effecting of termination of a SCSI host bus adaptor, the prior art has provided for automatic termination thereof. One example of such automatic termination of the host bus adaptor is provided by U.S. Pat. No. 5,434,516 issued to Kosco on Jul. 18, 1995 and entitled Automatic SCSI Termination Circuit, the entire contents of which are hereby expressly incorporated by reference. According to the Kosco automatic SCSI termination circuit, the presence of devices attached to either of the two ports of a SCSI host bus adaptor is sensed by monitoring the -GNDFB_INT and -GNDFB_EXT lines of the SCSI bus, as discussed in detail below.

However, the Kosco automatic SCSI termination circuit only facilitates termination at the SCSI host bus adaptor itself. It does not provide termination at the ends of the SCSI bus when SCSI devices are attached to one or both of the ports of the SCSI host bus adaptor, such as via a SCSI cable.

Further, the Kosco automatic SCSI termination circuit is only suitable for use in single ended (SE) device applications. Thus, when using the Kosco automatic SCSI termination circuit, low voltage differential (LVD) devices cannot be attached to the SCSI bus and manual intervention is still required in order to effect termination at the last device attached to either port of the SCSI host bus adaptor.

In view of the foregoing, it is desirable to provide automatic termination which facilitates termination of both the SCSI host bus adaptor and the ends of the SCSI bus without requiring manual operations when devices are attached to one or more of the ports of the SCSI host bus adaptor. It is further desirable to provide for the automatic detection of the type of devices, e.g., single ended (SE), low voltage differential (LVD) or a combination of both single ended (SE) and low voltage differential (LVD), attached to the SCSI bus and to terminate the SCSI host bus adaptor and/or the ends of the SCSI bus to which the devices are attached accordingly.

SUMMARY OF THE INVENTION

The present invention specifically addresses and alleviates the above mentioned deficiencies associates with the prior art. More particularly, the present invention comprises a SCSI host bus adaptor which is configured so as to facilitate the automatic termination of any SCSI ports thereof to which no devices are attached. Termination is performed in a manner which provides correct termination for either single ended (SE) devices, low voltage differential (LVD) devices or any combination thereof.

In a further aspect, the present invention further comprises a cable which facilitates such automatic multi-mode termination of any devices attached thereto. Thus, an automatic termination circuit of the cable senses the presence of any single ended (SE) devices, low voltage differential (LVD) devices or any combination thereof, and provides the proper termination therefor.

Optionally, the SCSI cable may comprise a plurality of branches which extend from a trunk thereof, so as to facilitate more convenient attachment of devices thereto.

BRIEF DESCRIPTION OF THE DRAWINGS

These and other features, aspects and advantages of the present invention will be more fully understood when considered with respect to the following detailed description, appended claims and accompanying drawings, wherein:

FIG. 3 is a block diagram of a SCSI host bus adapter having automatic multi-mode termination according to the present invention;

FIG. 4 is a block diagram of a SCSI cable having automatic multi-mode termination according to the present invention;

DETAILED DESCRIPTION OF THE INVENTION

Figure 1:
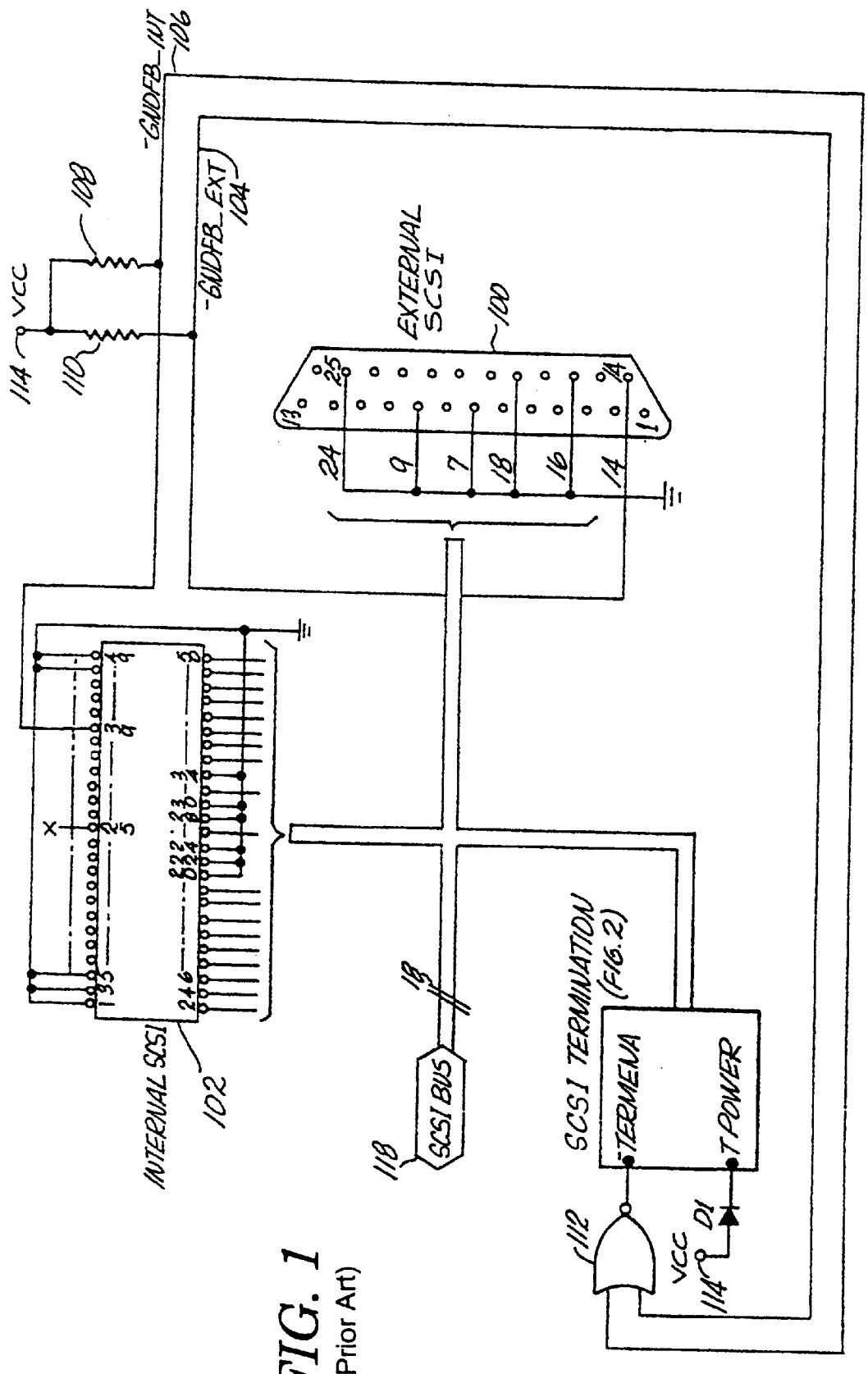
FIG. 1 is a block diagram of a prior art SCSI device detection circuit having a comparison apparatus.

While the present invention is open to various modifications and alternative constructions, the preferred embodiment shown in the drawings will be described herein in detail. It is to be understood, however, that there is no intention to limit the invention to the particular forms disclosed. On the contrary, it is intended that the invention cover all modifications, equivalences and alternative constructions falling within the spirit and scope of the invention as expressed in the appended claims.

First, it will be beneficial to describe the prior art automatic SCSI termination circuit of Kosco, since this method may optionally be used to provide automatic termination of the SCSI host bus adapter. Thus, in one embodiment, the present invention comprises the prior art automatic SCSI termination circuit of Kosco in combination with a new circuit for providing automatic termination of the last device on a SCSI bus.

Referring to FIG. 1, an external SCSI port connector 100 is configured to facilitate connection of a SCSI host bus adaptor to one or more external SCSI devices. Although the external SCSI port connector 100 is depicted as an industry standard DB25 connector, external SCSI port connector 100 can be implemented in practice by any suitable connector which provides the appropriate number of pins. Similarly, internal SCSI port connector 102 is a connector designed for coupling the SCSI host bus adapter to one or more internal SCSI devices. Although the internal SCSI port connector 102 is depicted as a 25×2 connector, it may likewise be implemented by any suitable equivalent connector.

As shown in FIG. 1, a signal designated -GNDFB_EXT 104 is communicated from external SCSI port connector 100 by pin 14 thereof. A signal, designated -GNDFB_INT 106 is similarly communicated from SCSI connector 102 at pin 39. These connections are chosen because they provide ground feedback signals which are indicative of devices attached to the SCSI bus, as is described in further detail below. Each of these two ground feedback signals will be at approximately zero volts when a device is detected on the respective external or internal SCSI connector. When these signals are not approximately zero volts, since no device is connected to the particular port, one of the two pull-up resistors 108 and 110, will bring the voltage on the corresponding ground feedback line up to approximately the voltage of VCC, thus indicating to the logic of the automatic termination circuit that no device is present on that port.

The two ground feedback signals, -GMDFB_EXT and GNDFB-INT are coupled to two inputs of a logical NOR gate 112. The output from the logical NOR gate 112 is indicated as -TERMENA and provides the appropriate signal to the termination circuit depicted in FIG. 2. Thus, when no device is present on either the external 100 or internal 102 SCSI port connector, then termination will be enabled by a signal of approximately zero volts on -TERMENA. When there is no device on external SCSI port connector 100 and there is a device present and detected on internal SCSI port connector 102, then termination will also be enabled. When there is a device detected on external SCSI port connector 100 and there is no device detected on internal SCSI port connector 102, then termination will also be enabled. However, when there is a device detected on external SCSI port connector 100 and there is also a device detected on internal SCSI port connector 102, termination will be disabled, as indicated by a logical high signal on -TERMENA.

In addition to the automatic termination aspects as previously described, FIG. 1 depicts the appropriate bus interconnections between the external SCSI port connector 100, the internal SCSI port connector 102 and the SCSI Host Bus Adapter. In the preferred embodiment, the external SCSI port connecter 100 has the following standard SCSI signals associated with particular pins thereof: -SC7 is connected to pin 13; -SC6 is connected to pin 12; -SC5 is connected to pin 11; -SC4 is connected to pin 23; -SC3 is connected to pin 10; -SC2 is connected to pin 22, -SC1 is connected to pin 21; -SC0 is connected to pin 8; -SPAR is connected to pin 20; -SSEL is connected to pin 19; -SBSY is connected to pin 6; -SACK is connected to pin 5; -SATN is connected to pin 17; -SRST is connected to pin 4; -SIO is connected to pin 3; -SCD is connected to pin 15; -SMSG is connected to pin 2; -SREQ is connected to pin 1; TERMPWR is connected to pin 25; and pins 24, 9, 7, 18, and 16 are connected to ground. These SCSI interconnections are those appropriate for a DB25 industry standard SCSI connector. Other connectors may alternatively be utilized and appropriate interconnections must be made according to the type of connector desired.

The internal SCSI port connector 102 has the following SCSI interconnections from the SCSI bus, which connect to the following particular pins of internal SCSI port connector 102: -SC0 is connected to pin 2; -SC1 is connected to pin 4; -SC2 is connected to pin 6; -SC3 is connected to pin 8; -SC4 is connected to pin 10; -SC5 is connected to pin 12; -SC6 is connected to pin 14; -SC7 is connected to pin 16; -SPAR is connected to pin 18; TERMPWR is connected to pin 26; -SATN is connected to pin 32; -SBSY is connected to pin 36; -SACK is connected to pin 38; -SRST is connected to pin 40; -SMSG is connected to pin 42; -SSEL is connected to pin 44; -SCD is connected to pin 46; -S-REQ is connected to pin 48; -SIO is connected to pin 50; and pins 1, 3, 5, 7, 9, 11, 13, 15, 17, 19, 20, 21, 22, 23, 24, 27, 28, 29, 30, 31, 33, 34, 35, 37, 41, 43, 45, 47, and 49 are connected to ground.

Figure 2:
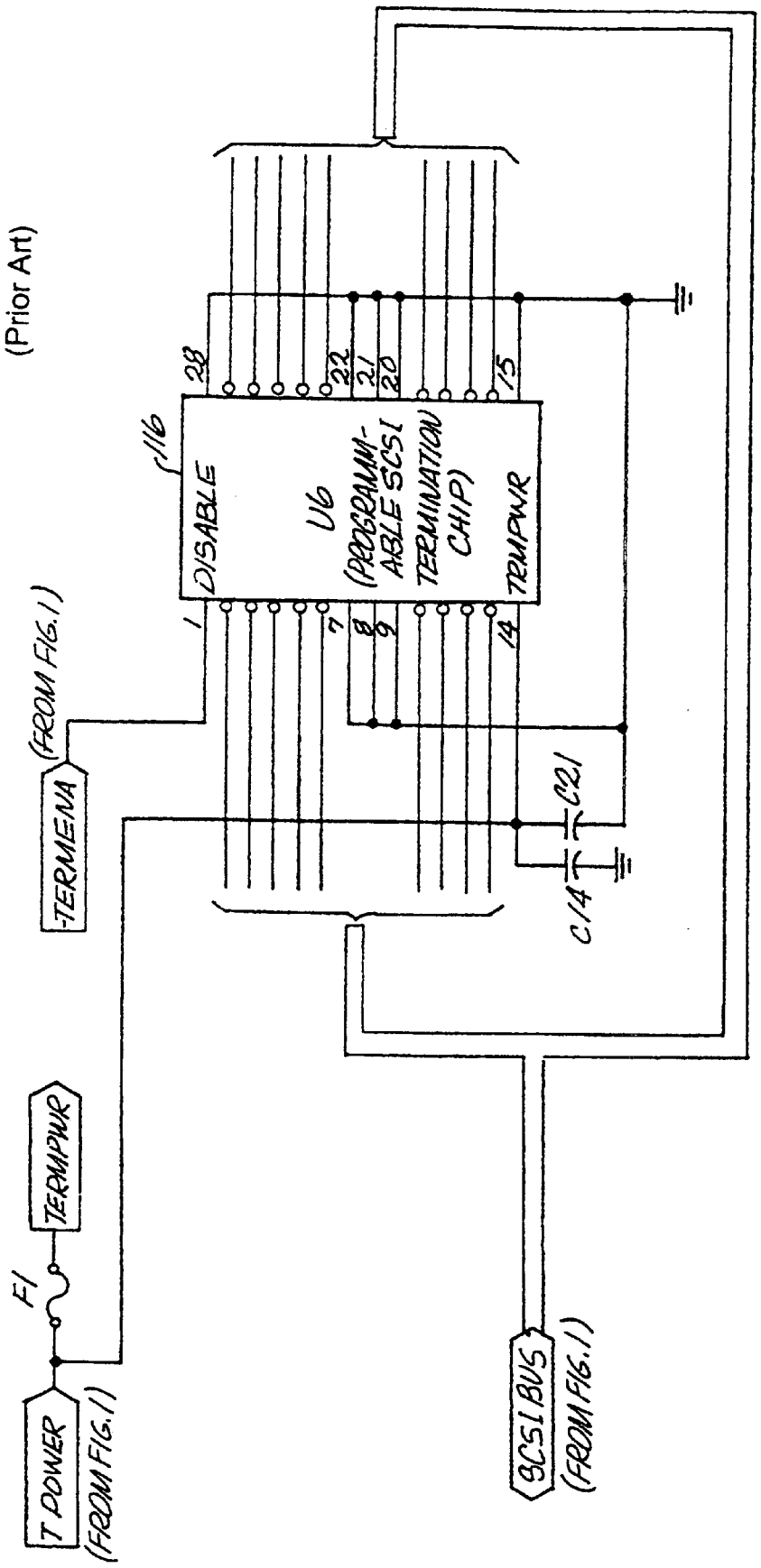
FIG. 2 is a block diagram of a prior art termination circuit.

In the preferred embodiment a power source VCC 134 is connected through a diode D1, and is designated TPOWER (shown in both FIG. 1 and FIG. 2). Diode D1 is present to prevent the inadvertent backflow of current from the SCSI termination circuit to the power supply. In the preferred embodiment the diode is provided by part number IN5817. Also in the preferred embodiment, resistors 108 and 110, are provided by 1 K ohm resistors, however, any value appropriate for a low power pull-up resistor would be suitable.

In the preferred embodiment, the logical NOR operation is provided by a programmable logic array, however, the logical NOR can be achieved through any suitable means including TTL or CMOS implementation, or may be controlled by another portion of a relevant circuit capable of performing the requisite logical comparison. Only the logical NOR comparison operation is important to the proper functioning of the automatic termination circuit; any logical signal comparison for the presence of devices on external 100 or internal 102 SCSI port connector and providing the appropriate termination enable/disable signal will suffice according to the present invention.

Referring now to FIG. 2, the portion of the circuit which provides for an active SCSI termination is shown. Termination power is provided by signal TPOWER which is present on FIG. 1 and FIG. 2 and is connected to pin 14 of termination microchip 116, part number UC5601DW manufactured by Unitrode Corporation of Marrimack, N.H. In FIG. 2, termination microchip 116 is a single chip implementation of a SCSI termination circuit, and is depicted with its pin 1 in the upper left hand corner, the pin numbers increasing downward on the left side, pin 14 in the lower left corner, pin 15 in the lower right corner, with pin numbers increasing to pin 28 in the upper right hand corner. Those skilled in the art will appreciate that other implementations of the SCSI termination circuit are likewise suitable. Various circuits for enabling/disabling termination in response to an electrical signal are contemplated.

In the preferred embodiment, the signal -TERMENA is coupled to pin 1 of termination microchip 116; TPOWER is coupled to pin 14; pins 7, 8, 9, 20, 21, 22, and 28 are coupled to ground. Each of the eighteen SCSI signals are connected to one of the eighteen termination pins of the termination chip. The bus depicted in FIG. 2 contains the same eighteen signals as the bus in FIG. 1. In addition, stabilization capacitance is provided between TPOWER at pin 14 of termination microchip 116 and ground.

The logical operations comparing the presence of devices on external 100 and internal 102 SCSI port connectors which provide the appropriate enable/disable signal to the SCSI termination circuit may be accomplished by any of the previously mentioned logical comparison means, as well as any equivalents thereof.

Referring now to FIG. 3, the SCSI host bus adaptor 200 of the present invention preferably comprises SCSI bus adaptor circuitry 201 which facilitates interfacing of the SCSI bus defined by external SCSI bus 202 and internal SCSI bus 203, to the host computer bus, which is typically either an IDE or PCI bus. SCSI bus adapter circuitry operates according to well known principles to effect such interfacing. An internal connector 204 facilitates the attachment of a SCSI cable to the SCSI host bus adaptor 200, so as to further define the internal SCSI bus 203 and facilitate attachment of desired internal devices, e.g., disk drives, tape drives, CD-Roms, etc., thereto. Similarly, an external SCSI connector 206 facilitates the attachment of an external SCSI cable to the SCSI host bus adaptor 200 to further define the external SCSI bus 202 and to facilitate the attachment of external devices, thereto.

Preferably, adaptor termination circuit 207 senses the presence of devices attached to the external SCSI bus 202 and the internal SCSI bus 203 via the -GNDFB_INT line 208 and the internal SCSI bus -GMDFB_EXT line 209, respectively, as discussed in detail above.

Alternatively, the adaptor termination circuit 207 comprises a multi-mode SCSI line terminator, such as the Multi-Mode SCSI 9 Line Terminator Model Number UCC5630A, manufactured by Unitrode Corporation of Marrimack, N.H., which effects automatic multimode termination as discussed in detail below.

In any event, adapter termination circuit 207 comprises a circuit configured to sense the presence of devices on the external SCSI bus 202 and the internal SCSI bus 203 and to provide termination when the SCSI host bus adapter 200 defines one end of the SCSI bus.

The adapter termination circuit 207 is in communication with the external SCSI bus 202 and internal SCSI bus 203 via termination bus 211, so as to effect desired termination therefor. Thus, termination bus 211 facilitates the switching of termination resistors into communication with the SCSI bus when the SCSI host bus adapter 200 defines one end of the SCSI bus. The external SCSI bus 202, the internal SCSI bus 203, and the termination bus 211 which facilitates communication of the adapter termination circuit 207 the external SCSI bus 202 and the internal SCSI bus 203, may either be 50 conductor buses or 68 conductor buses, as desired. Indeed, the automatic multi-mode termination of the present invention may be used on a bus of any desired size.

In operation, the adaptor termination circuit 207 monitors the external SCSI bus 202 and the internal SCSI bus 203, via -GNDFB_EXT-208 and -GNDFB_EXT-209, respectively, so as to detect the presence of devices on either the external SCSI bus 202 or internal SCSI bus 203. Alternatively, adaptor termination circuit 207 may monitor the DIFFSENS line of the external SCSI bus 202 and internal SCSI bus 203 so as to determine the type of device, e.g., single ended (SE) or low voltage differential (LVD), which is installed upon either the external SCSI bus 202 or internal SCSI bus 203. The DIFFSENS line is monitored when the adaptor termination circuit 207 comprises a multimode SCSI line terminator, such as the multimode SCSI 9 line terminator described above.

Referring now to FIG. 4, a SCSI cable 300 is configured so as to provide automatic multi-mode termination for any single ended (SE) or low voltage differential (LVD) devices attached thereto. The cable 300 has a SCSI cable connector 303 at a proximal end thereof and has an automatic cable termination circuit 304 at the distal end thereof. Device connectors 306, 307, and 308 facilitate the attachment of devices, e.g., single end (SE) and low voltage differential (LVD) devices, to SCSI bus 302 defined by the cable 300. The cable connector 303 facilitates attachment of the cable 300 to a SCSI host bus adaptor.

The automatic cable termination circuit 304 preferably comprises a multi-mode SCSI line terminator, such as the Multi-Mode SCSI 9 Line Terminator Model Number UCC5630A manufactured by Unitrode Corporation of Marrimack, N.H. However, like the adapter termination circuit 207 of FIG. 3, the automatic cable termination circuit 304 of FIG. 4 may alternatively comprise any circuit suitable for detecting the presence and/or types of devices attached to the cable 300 and which enables/disables termination in response to such sensing.

In operation, the automatic multi-mode termination of cable 300 provides the correct termination for either single ended (SE) or low voltage differential (LVD) devices by monitoring the DIFFSENS line of the SCSI bus 302 and providing the desired termination in response to the voltage sensed on the DIFFSENS line, as discussed in detail below.

According to the present invention, any desired combination of single ended (SE) and low voltage differential (LVD) devices may be attached to the SCSI bus via either the internal or external cables therefor. When a UCC5630A multi-mode SCSI terminator, for example, is used to effect termination of either the devices attached to the cable or an unused port of the SCSI host bus adaptor 200, then device type detection is accomplished by monitoring the DIFFSENS line of the SCSI bus. This is possible since multi functions are provided on the same, i.e., DIFFSENS line via the use of a plurality of different voltage levels, which serve as indicators of the type of device attached thereto.

The UCC5630multi-mode SCSI terminator assumes the low voltage differential (LVD) DIFFSENS voltage of 0.7 to 1.9 volts as a default level. When the voltage is changed from the default level to above 2.2 volts, then the presence of a high voltage differential (HVD) device is indicated and when the voltage falls below 0.6 volts, then the presence of a single ended (SE) device is indicated. It is worth while to note that when any single ended (SE) devices are present, they override the DIFFSENS voltage and hold it at the low level, i.e., below 0.6 volts. Thus, when any single end (SE) devices are attached to the SCSI bus, then termination for single end (SE) devices is provided, even if low voltage differential (LVD) devices are also present. When both single ended (SE) and low voltage differential(LVD) devices are present, then the low voltage differential (LVD) devices operate in a single ended (SE) compatible mode, wherein single end (SE) termination is suitable therefore.

When high voltage differential (HVD) devices are sensed on the SCSI bus, it is assumed that their connection thereto is a mistake and the SCSI host bus adapter is deactivated so as to prevent damage thereto, as discussed below.

As those skilled in the art will appreciate, all devices attached to a SCSI cable bus the DIFFSENS signal of the SCSI bus to determine the speed of the SCSI bus protocol supported. When the DIFFSENS is at a ground or single ended (SE) level of less than 0.6 volts, then single ended (SE) Ultra Data Transfers may occur at 20 M bits/sec. When only low voltage differential (LVD) devices are present, then LVD Ultra 2 protocol is enabled, thereby facilitating Fast40 performance at 40 Megabits/sec.

The UCC5630multi-mode SCSI terminator is designed so as to monitor the DIFFSENS signal at approximately every 100 milliseconds, so as to automatically verify the type of devices which are present. The ground signal assignment of single ended devices guarantees that the DIFFSENS will be pulled to ground, e.g., have a voltage below 0.6 volts, if any single ended (SE) devices are attached to the SCSI cable 302a. This indicates to the automatic cable termination circuit 304 at the end of each SCSI cable 302a that there are single ended (SE) devices present on the cable and that the SCSI protocol is single ended (SE).

In this manner, automatic cable termination circuit 304 can provide the proper type of termination for the type of devices which are attached to the SCSI cable 302A. That is, when only low voltage differential devices are attached to the SCSI cable 302a, then termination for low voltage differential (LVD) devices is provided. When either a mixture of single ended (SE) and low voltage differential (LVD) or single ended (SE) devices only are attached to SCSI cable 302a, then termination for single ended devices is provided, since the communications protocol for single ended devices must be utilized.

If a high voltage differential (HVD) device is attached to the SCSI cable 302a, then the DIFFSENS is pulled to between 2.2 volts and 5 volts, thereby indicating that the single ended (SE) and low voltage differential (LVD) protocols must be disabled and the bus is not utilized. According to the preferred embodiment of the present invention, attachment of a high voltage differential (HVD) device to the SCSI cable 302 indicates an error condition, since the SCSI bus adaptor circuitry 201 is configured only to accommodate single ended (SE) and low voltage differential (LVD) devices.

However, those skilled in the art will appreciate that the SCSI adaptor circuitry 201 may alternatively be configured to accommodate single ended (SE), low voltage differential (LVD) and high voltage differential (HVD) devices, if desired. In this instance, a multi-mode SCSI terminator which operates according to the principles outlined herein may be utilized so as to provide desired termination for any mixture of single ended (SE), low voltage differential (LVD) and high voltage differential (HVD) devices.

The UCC5630is a Multi-mode active terminator with selectable single ended (SE) and low voltage differential (LVD) SCSI termination integrated into a monolithic component. Mode selection is accomplished with the DIFFSENS signal.

DIFFSENS is a three-level signal line, driven by an active terminator at each end of the bus. On power-up, the terminators will initially try to drive the DIFFSENS line to 1.3 volts, defaulting the bus to LVD mode. If a single ended SCSI device is plugged into the bus, the DIFFSENS line will be shorted to ground, signaling the terminators to change to SE mode, accommodating the SE device. Or, if a high voltage differential (HVD) device is plugged into the bus, the DIFFSENS line is pulled high and the terminators will be disabled.

The DIFFSENS line is monitored by each terminator through a 50 Hz noise filter at the DIFFB input pin. A set of comparators detect and select the appropriate termination for the bus in the following manner. If the DIFFSENS signal is below 0.5 volts, the termination network is single ended (SE). Between 0.7 volts and 1.9 volts, the termination network switches to low voltage differential (LVD), and above 2.4 volts is high voltage differential (HVD), causing the terminators to disconnect from the bus. These thresholds accommodate differences in ground potential that can occur with long lines.

Three UCC55630A multi-mode parts are required at each end of the bus to terminate 27 (189 data, plus 9 control) lines. Each part includes a DIFFSENS driver, but only one is necessary to drive the line. A MSTR/SLV input pin is provided to disable the other two. The master part must have its MSTR/SLV pin connected to TRMPWR and the two slave parts must have the MSTR/SLV inputs grounded. Only the master is connected directly to the SCSI bus DIFFSENS line. The DIFFB inputs on all three parts are connected together, allowing them to share the same 50 Hz noise filter.

All Unitrode LVD and multi-mode terminators operate down to 2.7 volt TRMPWR voltage. This accommodates 3.3 volt systems, with allowance for the 3.3 volt supply tolerance (+/−10%), a unidirectional fusing device and cable drop. In 3.3 volt TRMPWR system, the Unitrode UCC3912 is recommended in place of the fuse and diode. The UCC3912's lower voltage drop allows additional margin over the fuse and diode, for the far and terminator.

Layout is very critical for Ultra2 and Ultra3 systems. The SPI-2 standard for capacitance loading is 10 pF maximum from each + and − signal line to ground, and a maximum of 5 pF between the + and − signal lines of each pair is allowed. These maximum capacitances apply to differential bus termination circuitry that is not part of a SCSI device, e.g., a cable terminator. If the termination circuitry is included as part of a SCSI device, e.g., a host adaptor, disk or tape drive, then the corresponding requirements are 30 pF maximum from each + and − signal line to ground and 15 pF maximum between the + and − signal lines of each pair.

The SPI-2 standard for capacitance balance of each pair and balance between pairs is more stringent. The standard is 0.7 5 pF maximum difference from the + and − signal lines of each pair to ground. An additional requirement is a maximum difference of 2 pF when comparing pair to pair. These requirements apply to differential bus termination circuitry that is not part of a SCSI device. If the termination circuitry is included as part of a device, then the corresponding balance requirements are 2.25 pF maximum difference within a pair, and 3 pF from pair to pair.

Feed-throughs, through-hole connections, and etch lengths need to be carefully balanced. Standard multi-layer power and ground plane spacing add about 1 pF to each plane. Each feed-through will add about 2.5 pF to 3.5 pF. Enlarging the clearance holes on both power and ground planes will reduce the capacitance. Similarly, opening up the power and ground planes under the connection will reduce the capacitance for through-hole connector applications. Capacitance will also be affected by components, in close proximity, above and below the circuit board.

Unitrode multi-mode terminators are designated with very tight balance, typically 0.1 pF between pins in a pair of 0.3 pF between pairs. At each L+ pin, a ground driver drives the pin to ground, while in single ended mode. The ground driver is specially designed to not effect the capacitive balance of the bus when the device is in LVD or disconnect mode.

Multi-layer boards need to adhere to the 120 ohm impedance standard, including the connectors and feed-throughs. This is normally done on the outer layers with 4 mil etch and mil spacing between runs within a pair, and a minimum of 8 mil spacing to the adjacent pairs to reduce crosstalk. Microstrip technology is normally too low of impedance and should not be used. It is designed for 50 ohm rather than 120 ohm differential systems.

Careful consideration must be given to the issue of heat management. A multi-mode terminator, operating in SE mode, will dissipate as much as 130 mW of instantaneous power per active line with TRMPWR=5.25 volts. The UCC5630is offered in a 36 pin SSOP and a 48 lead LFQP. Both packages include heat sink ground pins. These heat sink/ground pins are directly connected to the die mount paddle under the die and conduct heat from the die to reduce the junction temperature. All of the HS/GND pins need to be connected to etch area or a feed-through per pin connecting to the ground plane layer on a multi-layer board.

Figure 5:
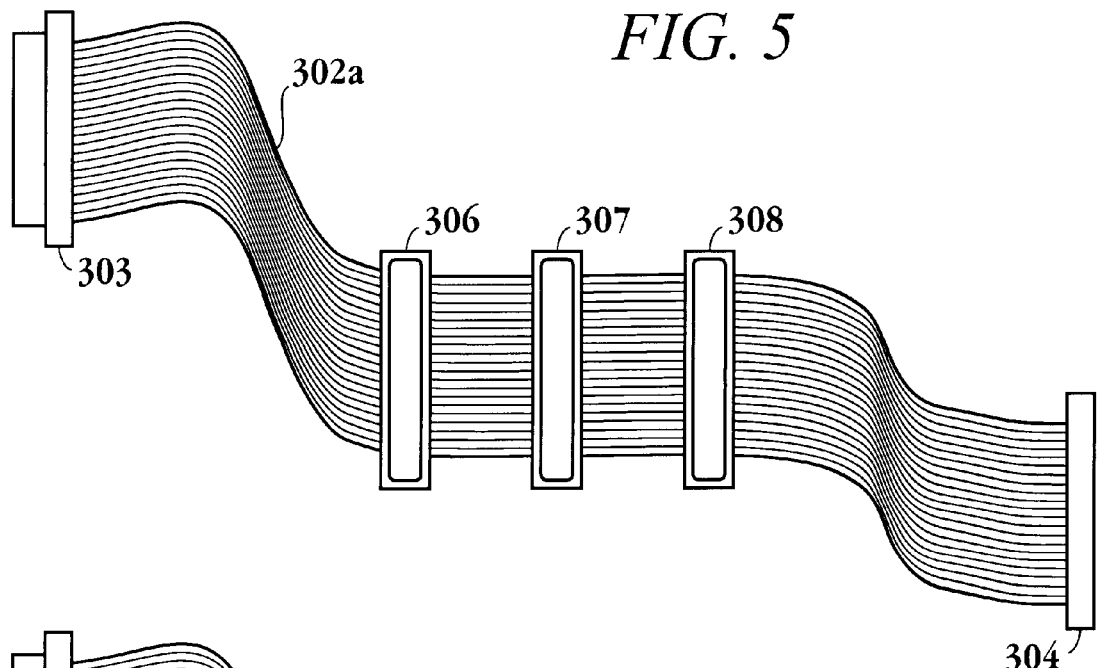
FIG. 5 is a perspective view of a first embodiment of a SCSI cable incorporating automatic multi-mode termination according to the present invention.

Referring now to FIG. 5, a first embodiment of a SCSI cable which provides automatic multi-mode termination according to the present invention comprises a ribbon cable 302A which defines either the internal or external SCSI bus 302 of FIG. 4. SCSI cable connector 303 is configured to facilitate attachment of the proximal end of the SCSI cable 302A to either an external SCSI port connector or an internal SCSI port connector, as desired. Device connectors 306, 307, and 308 facilitate the attachment of desired devices to the SCSI cable 302A. Automatic termination circuit 304 on the distal end of the SCSI cable 302A effects automatic multi-mode termination of any devices attached to the cable 302 via device connectors 306, 307 and 308, as discussed above.

Figure 6:
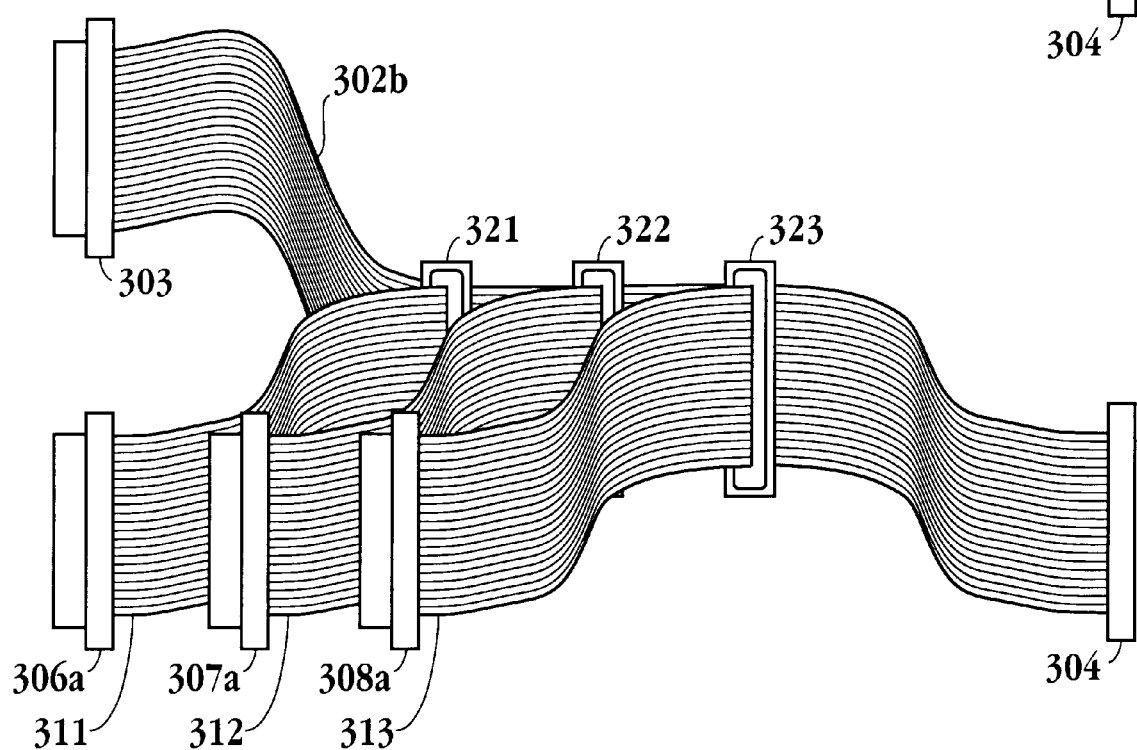
FIG. 6 is a perspective view of a second embodiment of a SCSI cable incorporating the automatic multi-mode termination according to the present invention.

Referring now to FIG. 6, according to a second preferred embodiment of the SCSI cable of the present invention, a plurality of branch cables 311, 312 and 313 extend from the SCSI trunk cable 302B and are in electrical communication therewith via the cable attachments 321, 322 and 323. Thus, the branch cables 311, 312 and 313 couple to the trunk cable 302B at the proximal ends of the branch cables 311, 312 and 313. Branch cables 311, 312 and 313 facilitate the more convenient attachment of devices to the SCSI trunk cable 302B.

It is understood that the exemplary automatic multi mode termination described herein and shown in the drawings represents only presently preferred embodiments of the invention. Indeed, various modifications and additions may be made to such embodiments without departing from the spirit and scope of the invention. For example, any desired number of device connectors 306, 307 and 308 or branch cables 311, 312 and 313 may be utilized. Further, those skilled in the art will appreciate that various different types and combinations of cable and/or connectors are suitable.

Thus, these and other modifications and additions may be obvious to those skilled in the art and may be implemented to adapt the present invention for use in a variety of different applications.

What is claimed is:

1. A computer system comprising:
    a CPU;
    a memory device;
    a host bus in electrical communication with the CPU and the memory device;
    a SCSI host bus adapter coupled to the host bus, the SCSI host bus adapter comprising a plurality of SCSI cable connectors for coupling a plurality of SCSI cables thereto, the SCSI host bus adapter further including;
    a first circuit for determining if any single ended (SE) and if any low voltage differential (LVD) devices are connected to the SCSI cable(s); and
    a second circuit for setting the terminator to provide low voltage differential (LVD) termination when only low voltage differential (LVD) devices are connected to the SCSI cable and for setting the terminator to provide single ended (SE) termination when only single ended (SE) devices are connected to the SCSI cable and when a combination of single ended (SE) and low voltage differential (LVD) devices are connected to the SCSI cable;
    at least one SCSI cable having a proximal end and a distal end, coupled at the proximal end thereof to a SCSI cable connector of the SCSI host bus adapter to define a SCSI bus; and
    a terminator coupled to the distal end of each SCSI cable for providing termination of SCSI devices attached to the SCSI cable.

2. The computer system according to claim 1, wherein the SCSI host bus adapter is configured to sense coupling of a SCSI device to each SCSI connector thereof and to automatically terminate any SCSI cable connector of the SCSI host bus adapter to which no SCSI device is coupled.

3. The computer system according to claim 1, wherein the terminator is permanently coupled to the distal end of each SCSI cable.

4. The computer system according to claim 1, wherein the SCSI host bus adapter comprises two connectors for coupling two SCSI cables thereto.

5. The computer system according to claim 1, wherein two SCSI cables are each coupled to a proximal end thereof to a respective connector of the SCSI host bus adapter.

6. The computer system according to claim 1, wherein the host bus comprises at least one of an IDE bus and a PCI bus.

7. The computer system according to claim 1, wherein the SCSI cable comprises a plurality of SCSI device connectors spaced apart therealong.

8. The computer system according to claim 1, wherein the SCSI cable comprises a plurality of branch cables coupled at a proximal end thereof to a trunk cable thereof, each branch cable having a SCSI device connector at a distal end thereof.

9. The computer system according to claim 1, wherein the SCSI cable is configured to facilitate attachment of at least one single ended (SE) device and at least one low voltage differential (LVD) device thereto.

10. The computer system according to claim 1, wherein the SCSI host bus adapter is configured to sense which type of SCSI device is coupled to the SCSI cable and to provide compatible termination for the type of device via the terminator.

11. The computer system according to claim 1, wherein the SCSI host bus adapter monitors a DIFFSENS line of the SCSI cable to determine if any single ended (SE) devices and if any low voltage differential (LVD) devices are connected to the SCSI cable.

12. The computer system according to claim 1, wherein the first circuit is configured to determine if any other devices are connected to the SCSI cable(s) and the second circuit is configured to disconnect the device from the adapter when any other device is connected to the SCSI cable.

13. A SCSI host bus adapter configured to be coupled to a host bus of a computer system, the SCSI host bus adapter comprising:
  a plurality of SCSI cable connectors for coupling a plurality of SCSI cables thereto;
  at least one SCSI cable having a proximal end and a distal end, coupled at the proximal end thereof to a SCSI cable connector of the SCSI host bus adapter to define a SCSI bus;
  a first circuit for determining if any single ended (SE) and if any low voltage differential (LVD) devices are connected to the SCSI cable(s);
  a second circuit for setting the terminator to provide low voltage differential (LVD) termination when only low voltage differential (LVD) devices are connected to a cable and for setting the terminator to provide single ended (SE) termination when only single ended (SE) devices are connected to the SCSI cable and when a combination of single ended (SE) and low voltage differential (LVD) devices are connected to the SCSI cable; and
  a terminator coupled to the distal end of each SCSI cable for providing termination of SCSI devices attached to the SCSI cable.

14. The SCSI host bus adapter according to claim 13, wherein the SCSI host bus adapter is configured to sense coupling of a terminated SCSI cable to each SCSI connector thereof and to automatically terminate any SCSI cable connector of the SCSI host bus adapter to which no terminated cable is coupled.

15. The SCSI host bus adapter according to claim 13, wherein the terminator is permanently coupled to the distal end of each SCSI cable.

16. The SCSI host bus adapter according to claim 13, wherein the terminator is removably coupled to the distal end of each SCSI cable.

17. The SCSI host bus adapter according to claim 13, wherein the SCSI host bus adapter comprises two connectors for coupling two SCSI cables thereto.

18. The SCSI host bus adapter according to claim 13, wherein two SCSI cables are each coupled to a proximal end thereof to a respective connector of the SCSI host bus adapter.

19. The SCSI host bus adapter according to claim 13, further comprising a connector for facilitating electrical communication with at least one of an IDE bus and a PCI bus of the computer system.

20. The SCSI host bus adapter according to claim 13, wherein the SCSI cable comprises a plurality of SCSI device connectors spaced apart therealong.

21. The SCSI host bus adapter according to claim 13, wherein the SCSI cable comprises a plurality of branch cables coupled at a proximal end thereof to a trunk cable thereof, each branch cable having a SCSI device connector at a distal end thereof.

22. The SCSI host bus adapter according to claim 13, wherein the SCSI cable is configure to facilitate attachment of at least one single ended (SE) device and at least one low voltage differential (LVD) device thereto.

23. The SCSI host bus adapter according to claim 13, wherein the SCSI host bus adapter is configured to sense which type of SCSI device is coupled to the SCSI cable and to provide compatible termination for the type of device via the terminator.

24. The SCSI host bus adapter according to claim 13, wherein the SCSI host bus adapter monitors a DIFFSENS line of the SCSI cable to determine if any single ended (SE) devices and if any low voltage differential (LVD) devices are connected to the SCSI cable.

25. The SCSI host bus adapter according to claim 13, wherein the first circuit is configured to determine if any other devices are connected to the SCSI cable(s) and the second circuit is configured to disconnect the device from the adapter when any other device is connected to the SCSI cable.

26. A method for facilitating connection of single ended (SE) and low voltage differential (LVD) devices to a SCSI host bus adapter via a common SCSI cable, the method comprising the steps of:
  sensing whether at least one low voltage differential (LVD) device, at least one single ended (SE) device or some combination of low voltage differential (LVD) and single ended (SE) devices is connected to the SCSI cable;
  automatically providing low voltage differential (LVD) termination for the SCSI cable when only low voltage differential (LVD) devices are connected to the SCSI cable;
  automatically providing single ended (SE) termination for the SCSI cable when only single ended (SE) devices are connected to the SCSI cable; and
  automatically providing single ended (SE) termination for the SCSI cable when both low voltage differential (LVD) devices and single ended (SE) devices are connected to the SCSI cable.

27. The method for facilitating connection of single ended (SE) and low voltage differential (LVD) devices to a SCSI host bus adapter according to claim 26, wherein the step of sensing whether at least one low voltage differential (LVD) device, at least one single ended (SE) device or some combination of low voltage differential (LVD) and single ended (SE) devices is connected to the SCSI cable comprises sensing a state of a DIFFSENS line of the SCSI cable.

28. The method for facilitating connection of single ended (SE) and low voltage differential (LVD) devices to a SCSI host bus adapter according to claim 26, further comprising the steps of sensing whether a device which is neither single ended (SE) nor low voltage differential (LVD) is connected to the SCSI cable and disabling communication between the SCSI host bus and the SCSI cable when a device which is neither single ended (SE) nor low voltage differential (LVD) is connected to the cable.

29. The method for facilitating connection of single ended (SE) and low voltage differential (LVD) devices to a SCSI host bus adapter according to claim 26, wherein the steps of providing low voltage differential (LVD) termination for the SCSI cable when only low voltage differential (LVD) devices are connected to the SCSI cable, providing single ended (SE) termination for the SCSI cable when only single ended (SE) devices are connected to the SCSI cable and providing single ended (SE) termination for the SCSI cable when both low voltage differential (LVD) devices and single ended (SE) devices are connected to the SCSI cable comprise electronically switching between low voltage differential (LVD) termination and single ended (SE) termination.

30. The method for facilitating connection of single ended (SE) and low voltage differential (LVD) devices to a SCSI host bus adapter according to claim 26, wherein the steps of providing low voltage differential (LVD) termination for the SCSI cable when only low voltage differential (LVD) devices are connected to the SCSI cable, providing single ended (SE) termination for the SCSI cable when only single ended (SE) devices are connected to the SCSI cable and providing single ended (SE) termination for the SCSI cable when both low voltage differential (LVD) devices and single ended (SE) devices are connected to the SCSI cable comprise electronically switching between low voltage differential (LVD) termination and single ended (SE) termination of a terminator disposed at a distal end of the SCSI cable.

31. The method for facilitating connection of single ended (SE) and low voltage differential (LVD) devices to a SCSI host bus adapter according to claim 26, wherein the step of sensing whether at least one low voltage differential (LVD) device, at least one single ended (SE) device or some combination of low voltage differential (LVD) and single ended (SE) devices is connected to the SCSI cable is performed by a circuit formed upon the host bus adapter.

32. The method for facilitating connection of single ended (SE) and low voltage differential (LVD) devices to a SCSI host bus adapter according to claim 26, wherein the steps of providing low voltage differential (LVD) termination for the SCSI cable when only low voltage differential (LVD) devices are connected to the SCSI cable, providing single ended (SE) termination for the SCSI cable when only single ended (SE) devices are connected to the SCSI cable and providing single ended (SE) termination for the SCSI cable when both low voltage differential (LVD) devices and single ended (SE) devices are connected to the SCSI cable are controlled by a circuit formed upon the SCSI host bus adapter.

33. The method for facilitating connection of single ended (SE) and low voltage differential (LVD) devices to a SCSI host bus adapter according to claim 26, further comprising the steps of:
  sensing whether no SCSI cables, one SCSI cable or two SCSI cables are connected to a SCSI host bust adapter;
  terminating both SCSI cable connectors of the SCSI host bus adapter when no SCSI cables are connected to the SCSI host bus adapter;
  terminating a SCSI cable connector of the SCSI host bus adapter to which a SCSI cable is not connected when one SCSI cable is connected to the SCSI host bus adapter; and
  not terminating either SCSI cable connector of the SCSI host bus adapter when two SCSI cables are connected to the SCSI host bust adapter.

34. The method for facilitating connection of single ended (SE) and low voltage differential (LVD) devices to a SCSI host bus adapter according to claim 33, wherein the step of sensing whether no SCSI cables, one SCSI cable or two SCSI cables are connected to a SCSI host bus adapter is performed by a circuit formed upon the SCSI host bus adapter.

35. The method for facilitating connection of single ended (SE) and low voltage differential (LVD) devices to a SCSI host bus adapter according to claim 33, wherein the step of terminating a SCSI cable connector of the SCSI host bus adapter is performed by a circuit formed upon the SCSI host bus adapter.

36. A SCSI host bus adapter and cable system for facilitating electrical communication with a plurality of SCSI devices, the SCSI host bus adapter comprising:
  a SCSI host bus adapter comprising:
    a plurality of SCSI connectors for coupling a plurality of SCSI cables thereto;
    a sensor circuit for sensing coupling of a device to each SCSI connector; and
    an automatic termination circuit for automatically terminating any SCSI cable connector of the SCSI host bus adapter to which a device is not attached;
  at least one SCSI cable having a proximal end and a distal end, attachable at the proximal end thereof to a connector of the SCSI host bus adapter to define a SCSI bus, the cable being configured such that a plurality of SCSI devices are attachable thereto; and
  a terminator coupled to the distal end of each SCSI cable for providing termination of SCSI devices attached to the SCSI cable, wherein the automatic termination circuit is configured to determine if any single ended (SE) and if any low voltage differential (LVD) devices are connected to the SCSI cable system and to adjust the terminator to provide one of low voltage differential termination and single ended termination based on the SCSI devices connected to the SCSI cable system.

37. The SCSI host bus adapter and cable system according to claim, 36, wherein a terminator is permanently coupled to the end of each SCSI cable.

38. The SCSI host bus adapter and cable system according to claim 36, wherein a terminator is removably coupled to the end of each SCSI cable.

39. The SCSI host bus adapter and cable system according to claim 36, wherein the SCSI host bus adapter has two connectors for coupling two SCSI cables thereto.

40. The SCSI host bus adapter and cable system according to claim 36, wherein two SCSI cables are coupled at proximal ends thereof to a connector of the SCSI host bus adapter.

41. The SCSI host bus adapter and cable system according to claim 36, wherein the SCSI cable comprises a plurality of SCSI device connectors spaced apart there along.

42. The SCSI host bus adapter and cable system according to claim 36, wherein the SCSI cable comprises a plurality of branch cables coupled at a proximal end thereof to a trunk cable thereof, each branch cable having, a SCSI device connector at a distal end thereof.

43. The SCSI host bus adapter and cable system according to claim 36, wherein the SCSI host bus adapter is configured to sense which type of SCSI device is coupled to the SCSI cable and to provide compatible termination for the type of device.

44. A SCSI cable comprising:
   a plurality of conductors extending in a generally parallel fashion and having proximal and distal ends;
   a host bus adapter connector attached to the conductors at a proximal end thereof for facilitating connection of the conductors to a SCSI host bus adapter;
   a plurality of device connectors attached to the conductors for facilitating connection of a plurality of devices to the conductors; and
   a terminator attached to the conductors at a distal end of the conductors, the terminator including an automatic termination circuit, the automatic termination circuit configured to determine if any single ended (SE) and if any low voltage differential (LVD) devices are connected to the SCSI cable and to adjust the terminator to provide one of low voltage differential termination and single ended termination based on the SCSI devices connected to the SCSI cable.

45. The SCSI cable according to claim 44, wherein the plurality of conductors comprise a DIFFSENS conductor and wherein the terminators are controlled via a signal on the DIFFSENS conductor.

46. The SCSI cable according to claim 44, wherein the conductors comprise a plurality of trunk conductors to which a plurality of branch conductors are attached.

* * * * *